United States Patent

[11] 3,526,162

| [72] | Inventor | Jesse A. Willcox<br>Excelsior, Minnesota |
|---|---|---|
| [21] | Appl. No. | 730,873 |
| [22] | Filed | May 21, 1968 |
| [45] | Patented | Sept. 1, 1970 |
| [73] | Assignee | Rogers, Freels & Associates, Inc.<br>Minneapolis, Minnesota<br>a corporation of Minnesota |

[54] PROCESS AND APPARATUS FOR CUTTING OF NON-METALLIC MATERIALS
9 Claims, 2 Drawing Figs.

[52] U.S. Cl................................................. 83/16,
83/53, 83/170, 83/177, 146/228, 51/321
[51] Int. Cl...................................................... B26f 1/26
[50] Field of Search....................................... 83/16,
53, 170, 177; 51/321; 146/227, 228

[56] References Cited
UNITED STATES PATENTS

| 2,881,503 | 4/1959 | Johnson | 51/321 |
| 2,985,050 | 5/1961 | Schwacha | 83/53 |
| 3,212,378 | 10/1965 | Rice | 83/53 |

*Primary Examiner*—William S. Lawson
*Attorney*—Williamson, Palmatier and Bains

ABSTRACT: A process and apparatus for cutting a body of non-metallic material comprising a nozzle means for delivering a jet of liquid cryogenic gas to a selected zone of the body of non-metallic materials to be cut. A second nozzle means for delivering a high velocity jet of liquid, such as water, to the treated zone of the non-metallic body to thereby effectively cut through the non-metallic body.

DIRECTION OF
MATERIAL MOVEMENT

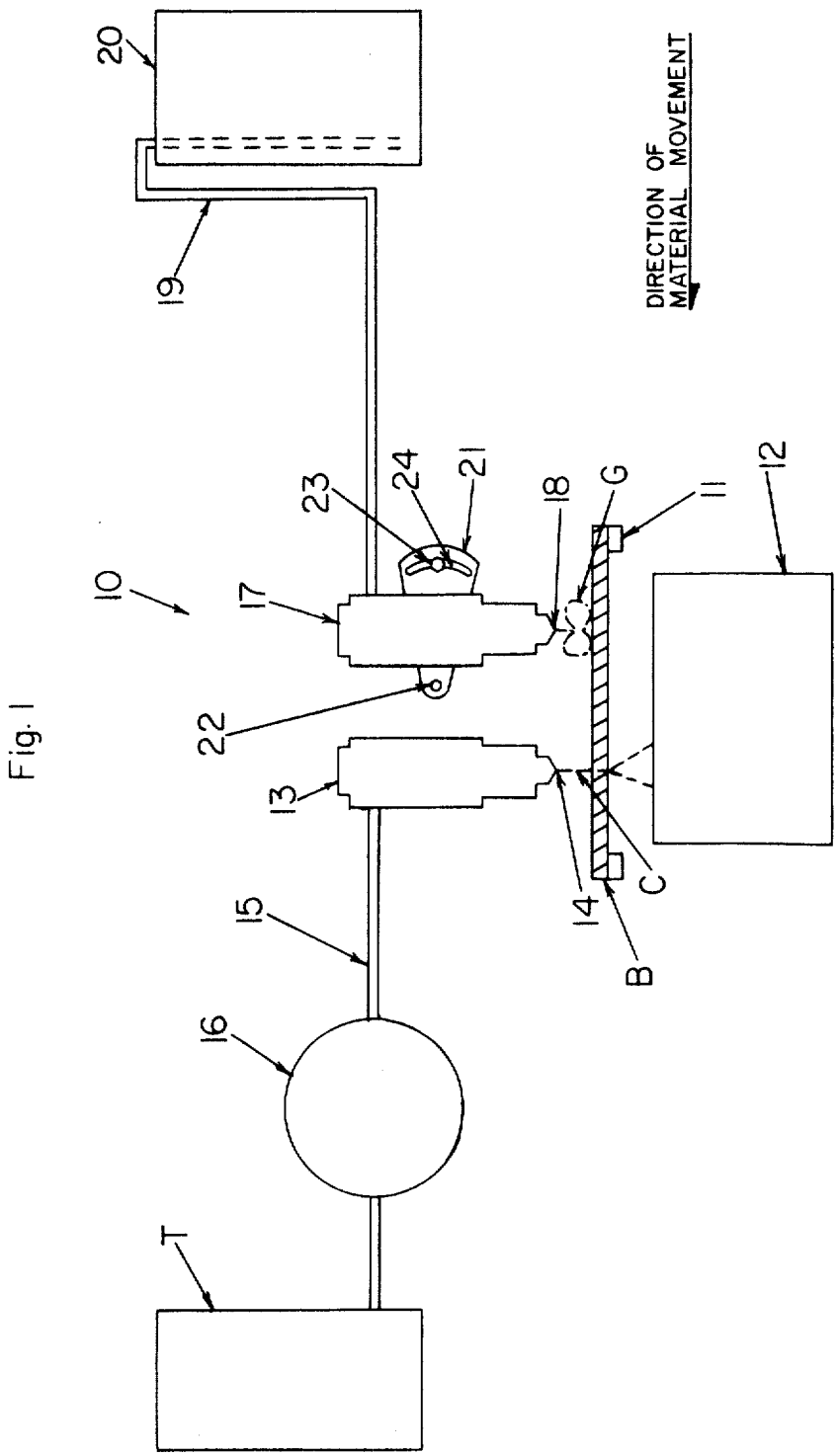

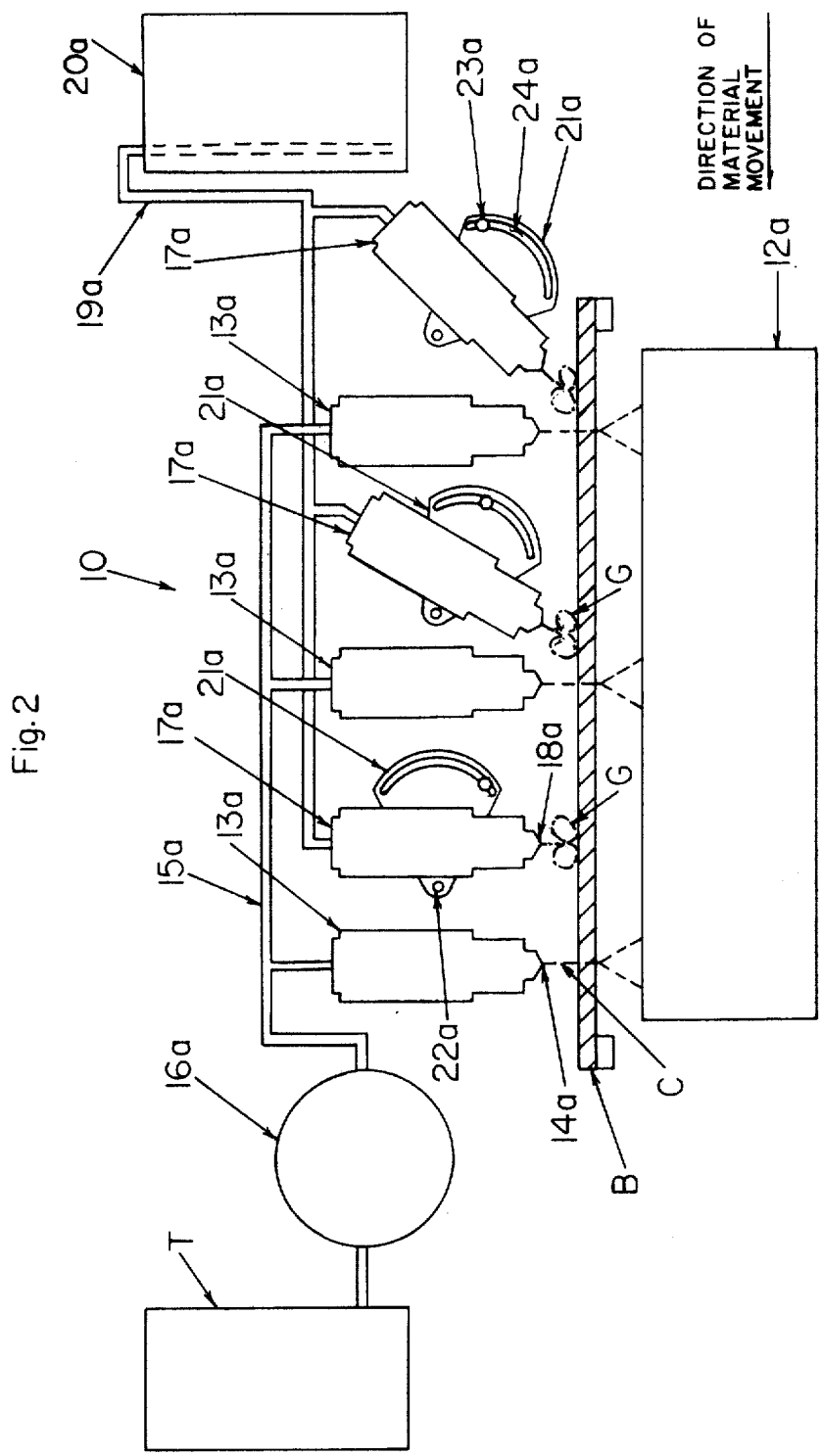

PROCESS AND APPARATUS FOR CUTTING OF NON-METALLIC MATERIALS

BRIEF DESCRIPTION OF THE INVENTION

A process and apparatus for cutting a non-metallic material with a high velocity of flowable liquid, such as water, and/or other liquids to readily and accurately cut through a body of non-metallic material. The non-metallic body being initially subjected along the zone to be cut to a jet of liquid cryogenic gas to quickly rigidify the treated zone. Thereafter instantaneously subjecting the treated zone to the high velocity jet of cutting liquid to thereby permit highly efficient cutting of non-metallic materials including normally flexible or resilient materials, cellular material and rigid non-metallic materials. The present process and apparatus also permits extremely accurate and precision cutting of a body of non-metallic material in an uninterrupted manner if desired, which is not possible with present conventional cutting systems.

A BRIEF DESCRIPTION OF THE FIGURES OF THE DRAWING

FIG. 1 is a diagrammatic illustration of the novel apparatus which may be employed in practicing the present process, and illustrating a single cryogenic gas discharge nozzle and a single fluid cutting nozzle positioned above the work to be cut; and FIG. 2 is a diagrammatic illustration similar to FIG. 1 but illustrating multiple sets of cryogenic gas discharge nozzles and fluid cutting nozzles positioned above the work to be cut.

DETAILED DESCRIPTION OF THE INVENTION

Although while it is generally known in the prior art that solid materials, such as metals, can be cut using high velocity fluid streams or jets, these prior art systems do not contemplate nor are they adaptable for use in cutting flexible materials, cellular materials or other materials whose physical characteristics are such that cutting with a high velocity liquid medium is not feasible. The present process and apparatus is primarily directed toward initially treating the non-metallic material to be cut with a liquid cryogenic gas to rigidify the zone of area to be cut, and thereafter subjecting the treated surface to the action of a high velocity jet of a cutting liquid.

The cryogenic gas to be used may be any of the commercially available cryogenic gases, such as liquid $CO_2$, nitrogen, oxygen, helium or the like. It is necessary to use the cryogenic gases in their liquid form in order to take advantage of the extreme low temperatures of the gases, and these liquid gases are normally available in commercial siphon bottle supply tanks. The discharge orifices of the nozzles which deliver the liquid cryogenic gas against the material to be cut must be insulated and the orifice opening must be of a size to deliver a relatively small jet of liquid gas against the surface of the material to be cut. In this regard, the size of the orifice opening for discharging the liquid cryogenic gas should be within the range of from about 0.003—0.015 inches in diameter.

As the cryogenic gas strikes the surface of the material to be cut the extremely cold temperature of the gas causes the non-metallic material to become rigid and in numerous instances frozen. However, the material thus treated will remain rigid for only a short period of time when the cutting is to be done at ambient temperatures. It has been found that the material (depending upon the kind of material) to be cut, will remain rigid in the treated zone for such a short period of time that it is often measured in milliseconds. It is, therefore, necessary to follow the cryogenic gas treatment step with the immediate application of the cutting fluid to the treated zone. Experience has indicated that the distance between the cryogenic gas discharge nozzle and the cutting fluid jet discharge nozzle is preferably less than one inch under ideal speed conditions. It should be pointed out that speed refers to the surface feet per minute travel of the body of material being cut.

Rubber and other resilient materials are typical of the materials to be cut by the instant process and through use of the apparatus system described herein. When rubber and other resilient materials are cut through the use of the instant process, the surface temperature of the material is drastically reduced from that of ambient room temperatures (72°) to an extremely low temperature by exposure to the impingement of the liquid cryogenic gas upon the surface. This treatment step causes rigidity in the treated zone and when cellular materials, such as vegetables are treated, it is noted that the water, oils or other fluids within the cells also become less viscous, or in some instances, actually frozen. In the case of synthetic materials, such as thermoplastics and the like, laminates or combinations thereof, treatment with the cryogenic gas will rigidify at least the treated surface zone of the material exposed. It is pointed out that the effectiveness and the efficiency of the cutting force of the high velocity liquid jets are greatly increased when cutting semi-rigid or solid materials. Therefore, rigidifying a surface zone area of the flexible material, such as thermoplastics or laminates, improves the efficiency of the high velocity cutting liquid jets.

In some instances, the material to be cut has a thickness dimension substantially greater than the cutting capacity of a single high velocity liquid jet. In this type of situation, the thickness dimension of the material is of such magnitude that a single high velocity liquid fluid jet is unable to cut through the material with a single pass when operating at normal speeds. However, the efficient cutting can be attained through the use of the instant process by alternately treating the material to be cut with cryogenic gas jets and high velocity liquid jets which may be arranged in line or in some alternate system so that a deeper cut can be made with one pass. In this arrangement, the body to be cut is continuously and alternately subjected to liquid cryogenic gas and liquid cutting fluid jets until the cut is made. Thus relatively thick bodies of non-metallic material may be readily cut in a highly efficient economic manner.

It has also been found that the present process and apparatus is highly effective in cutting thick, porous or cellular materials, such as concrete or the like. In this regard, when porous materials, such as concrete, are subjected to the effect of high velocity liquid jets some of the liquid will flow laterally from the general axis of the jet and will flow into the interstices or cellular spaces. When these cellular spaces become filled with the cutting liquid and when thereafter treated with the liquid cryogenic gases, the cutting liquid tends to expand on freezing thereby eroding or causing the material defining the cellular spaces to crumble. Therefore, with this arrangement, alternate cutting with liquid and freezing by cryogenic gases produces a cutting and eroding effect so that relatively thick bodies of non-metallic material may also be effectively cut. In this regard, the cryogenic gases serve to produce an eroding effect in a cellular or porous type rigid material.

The particular cutting liquid to be used may be water, although it has been found that the cutting efficiency of water may be greatly increased if water is mixed with oil, glycerine or some other oleaginous liquid which reduces the coefficient of friction of the cutting liquid as it passes through the nozzle mechanism. In this regard, it is pointed out that water may be used alone or in combination with oil, glycerine or combinations thereof. Another material which may be advantageously used in combination with water is polyethylene oxide and it has been found that when it is mixed with water, the cutting efficiency of the liquid is greatly increased. Experience has indicated that a mixture of 5 percent volume of glycerine or polyethylene oxide in water is highly effective as a cutting agent.

Many other materials may also be cut with the instant process and apparatus and such materials include vegetable cells (common garden vegetables), wood fibers processed as (chip) boarding or wood veneer laminates, natural and synthetic rubbers, cellular plastic (rigid or flexible). The present process is also adapted for use in cutting plastic laminates or other types of flexible laminates, extremely thin plastic products, such as half mil film, whether such products are cut singly or stacked. In other words, substantially any non-metallic material may be cut with the present process whether such material be flexible, resilient, rigid, porous, cellular, laminated or the like.

Referring now to the drawings and more specifically to FIG. 1, it will be seen that one apparatus system 10 is there shown and includes a suitable support structure 11 for moving a body B of material to be cut in the direction of the arrows. The support structure 11 may be any suitable conveyor means arranged and constructed to move the body of material B at a predetermined speed and preferably below the respective discharge heads or nozzles of the cutting liquid and cryogenic gas. A disposal tank 12 is adapted to receive the cutting liquid therein and also to receive the heavier cold cryogenic gas as it flows around and down from the material being treated after first forming a fog after it impinges a material being treated. The tank 12 is also arranged and constructed to dampen the effect of the cutting liquid which is still traveling at a high velocity as it enters the tank. In this regard, the tank 12 may contain a predetermined amount of liquid prior to the beginning of operations of the present process.

A nozzle device 13 is provided having an orifice 14 at its lower end through which the high velocity jet of cutting liquid C passes. The nozzle device 13 is connected by suitable conduit 15 to a suitable source of cutting liquid comprised preferably of a mixture of water and a friction reducing liquid such as glycerine or polyethylene oxide. A pump 16 is interposed in flow controlling relation with respect to conduit 15 and serves to produce pressures in the order of 3000 psi to 50,000 psi. It is also pointed out that suitable valving will be provided in the conduit 15 as desired.

A nozzle device 17 is also provided and has an orifice 18 through which the liquid jet of cryogenic gas G is discharged. The nozzle 17 is connected by suitable conduit 19 to supply tank 20 which contains a suitable supply of liquid cryogenic gas under pressure. The liquid cryogenic gas, such as $CO_2$ or nitrogen, is discharged through the orifice 18 under normally confined pressures per square inch to impinge upon a relatively narrow zone on the upper surface of the body B of material to be cut. It will be noted that the nozzle device 17 is positioned slightly in advance of the nozzle 13 although it is pointed out above, the distances between their orifices may be approximately a distance less than one inch. The liquid stream of cryogenic gas G will strike a relatively narrow zone of the body B to rigidify the same and this liquid cryogenic gas after striking the surface will splash upwardly and boil thus forming a heavy visible fog which will flow downwardly around the body and into the disposal tank 12. The cutting jet C which passes through the body B will be dampened and collected in the disposal tank 12 as well as small bits of material of the magnitude of dust particles which are cut from the body B. The heavy, cold fog which results from the cryogenic jet will also serve to collect and entrain bits of dust which are produced by the cutting process.

The support structure 11 will not only be capable of moving the body B in a predetermined direction and at a preselected speed, but is also capable of vertical adjustment to insure maximum cutting efficiency of the apparatus. Suitable guards or shields will also be provided with the support structure 11 to confine overspray and to assure that the heavy cryogenic fog will flow downwardly into the disposal or collection 12.

Referring now to FIG. 2, it will be noted that a slightly different embodiment of the apparatus system is there shown and is designated generally by the reference 10a. This apparatus 10a includes a plurality of discharge and nozzle devices for discharging cutting liquids and a plurality of discharge nozzle devices discharging cryogenic gas jets. These nozzle devices are arranged in pairs so that one cutting liquid nozzle device is associated in close cooperative relation with one discharge nozzle device for discharging cryogenic gas against the body B to be cut. The apparatus 10a includes the support structure 11a substantially identical in construction to the support structure 11 of the embodiment in FIG. 1 and is adapted to support a body B of material to be cut. The disposal tank 12a is also provided and is adapted to collect and dampen the cutting liquid therein and also the cyrogenic fog in the manner of the embodiment in FIG. 1. A plurality of similar nozzle devices 13a are provided each having an orifice 14a therein, each being connected to a conduit 15a. The conduit 15a is connected to a suitable source of a cutting liquid such as a mixture of water and glycerine or polyethylene oxide. A pump 16a is interposed in flow controlling relation with respect to the conduit 15a and is operable to develop pressures of the magnitude of the embodiment of FIG. 1.

A plurality of similar nozzle devices 17a are also provided each having an orifice 18a therein and each being connected in communicating relation by conduit 19a to a supply tank 20a which contains a supply of cryogenic gas under pressure therein.

The support structure 11a is adapted to move the body B to be cut in the direction of the arrow and at a predetermined speed. It will be noted that each nozzle device 13a is positioned in close proximal relation (preferably less than one inch) to a nozzle device 17a. Each nozzle 17a, however, is positioned slightly in advance of the associated nozzle device 13a. All of the nozzle devices are disposed in alignment with respect to each other in the direction of travel of the body B so that the cut or kerf made by the nozzle device 13a located at the left of FIG. 2 is disposed in the same vertical plane as the cutting jet C and the jet G of the cryogenic gas of the other nozzle devices. With this arrangement, a successively deeper cut will be made by each pair of nozzle devices 13a and 17a as the material is moved in the direction of the arrows. Thus it will be seen that bodies B of non-metallic material may be readily and economically cut with the present process and apparatus even though such bodies have relatively large thickness dimensions.

It will, therefore, be seen from the foregoing that I have provided a novel process and apparatus which permits highly efficient cutting of bodies of non-metallic material regardless of whether such bodies are rigid, flexible, resilient, porous, cellular or solid.

From the foregoing description it will be seen that I have provided a novel process and apparatus for cutting materials with high velocity liquid medium, which apparatus and process is not only characterized by its simplicity, but is directed to a process and apparatus which is more efficient than heretofore known comparable system.

It will, of course, be understood that various changes may be made in the form, details, arrangement and proportions of the various parts without departing from the scope of my invention.

I claim:

1. A process for cutting a body of non-metallic material comprising:
    subjecting a relatively narrow zone of a body of non-metallic material to the action of a jet of liquid cryogenic gas; and
    subjecting the narrow zone of the body of non-metallic material to the action of a high velocity jet of liquid material to cut the body along the narrow zone.

2. The process as defined in claim 1 wherein said high velocity jet of liquid material is applied to the treated zone instantly after the application of liquid cryogenic gas thereto.

3. The process as defined in claim 1 and thereafter subjecting the narrow zone of the body of non-metallic material and the cut made therein alternately to the action of a jet of liquid cryogenic gas and a high velocity jet of liquid to permit progressive and deeper cutting through the body of non-metallic material.

4. The process as defined in claim 1 wherein said liquid cryogenic gas is selected from the group comprising carbon dioxide, nitrogen, helium and oxygen.

5. The process as defined in claim 1 wherein said liquid material includes water.

6. The process as defined in claim 1 wherein said cryogenic gas is heavier than air and entrains therein any dust particles produced by cutting of said body by said cutting jet.

7. An apparatus for cutting a non-metallic material comprising:

means for supporting a body of non-metallic material;

a first nozzle means positioned in close proximity to said supporting means and being connected to a source of liquid cryogenic gas under pressure, said nozzle means directing a jet of liquid cryogenic gas against a surface of a body of non-metallic material to be cut; and a second nozzle means positioned in close proximity to said first nozzle means and in close proximal relation to said support means and being connected to a source of liquid under high pressure, said second nozzle means directing a high velocity jet of liquid against that portion of the body of non-metallic material which has been subjected to said liquid cryogenic gas to thereby cut the body of non-metallic material.

8. The apparatus as defined in claim 7 wherein said supporting means is adapted to move the body of non-metallic material in a predetermined direction at a predetermined speed, whereby said jet of liquid cryogenic gas impinges against a relatively narrow surface zone of the body of non-metallic material to rigidify the same, and said high velocity jet of liquid strikes and cuts through said narrow treated surface zone of the body of non-metallic material.

9. The apparatus as defined in claim 7 wherein said liquid cryogenic gas is selected from the group comprising carbon dioxide and nitrogen, and said cutting liquid includes water.